Feb. 16, 1965 P. E. FENTON 3,169,292
PLASTIC SNAP FASTENER
Filed June 28, 1962
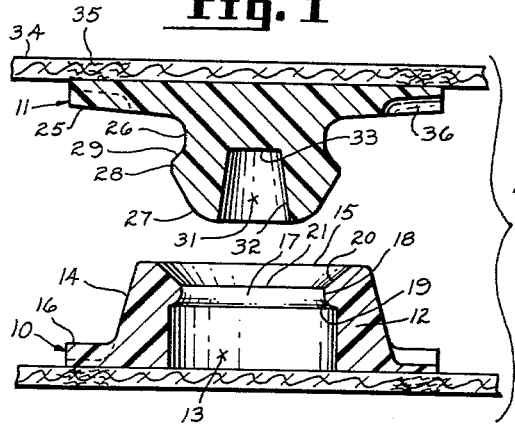
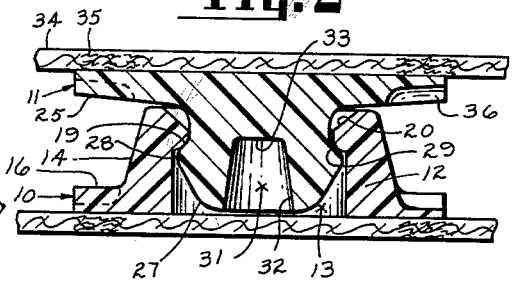
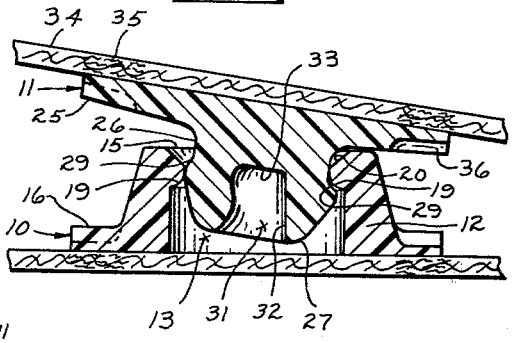
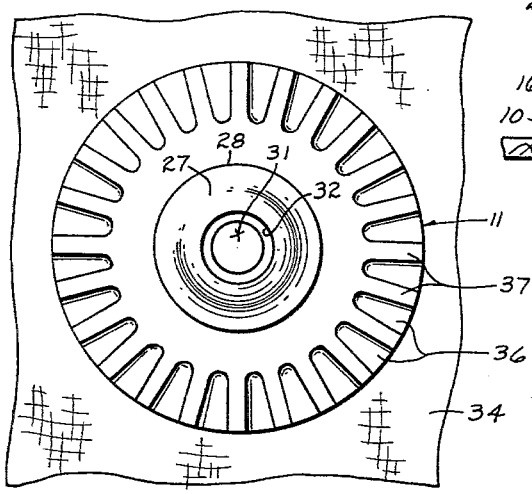
INVENTOR
Paul E. Fenton
BY
H. F. Johnston
ATTORNEY

United States Patent Office 3,169,292
Patented Feb. 16, 1965

3,169,292
PLASTIC SNAP FASTENER
Paul E. Fenton, Middlebury, Conn., assignor to Scovill Manufacturing Company, Waterbury, Conn., a corporation of Connecticut
Filed June 28, 1962, Ser. No. 205,992
2 Claims. (Cl. 24—213)

This invention relates to snap fasteners made of pliable plastic material. By this term, it is intended to characterize plastic materials, such as vinyl chloride polymeric material or regular polyethylene, which have a certain degree of rigidity in thicker sections although quite distinct from the general class of hard rigid plastics. In relatively thin sections, the pliable plastic material will be fairly readily flexed or distorted and returned to its original shape, although again, it does not possess these characteristics in the same sense as soft rubber. Materials or compounds having the desired physical properties can be easily selected by those skilled in the plastics art.

Snap fasteners in which stud and socket elements are each of one piece have been made from such material, but in prior fasteners of this class, engagement and disengagement depended primarily on stretching of the wall of the socket. This made the disengagement of the fastener rather difficult, and if the wall of the socket was made thin enough for easy action, there would be liability of tearing of the socket wall.

According to the present invention, the head portion of the stud element is made hollow, or with an axial recess opening through the end of the stud, while the neck of the stud is of solid cross-section. This permits inward bending or collapsing of the head of the stud while at the same time maintaining the desired strength and stiffness of the neck portion. With this improved construction, it is not necessary to stretch the socket wall to any great extent, with the result that comparatively easy snapping and unsnapping acion is obtained without danger of tearing the socket wall.

In the drawing:

FIG. 1 is a cross-sectional view of separated stud and socket elements embodying my invention and showing them attached to support pieces;

FIG. 2 is a similar view showing the elements as they appear assembled with each other;

FIG. 3 is a similar view showing the elements in the act of being separated from each other; and FIG. 4 is a plan view of the stud element.

Referring now to the drawing, the numeral 10 designates generally a socket element and 11 designates a stud element, and wherein each of said elements is made of a single piece of pliable plastic material.

The socket element 10 consists of a relatively thick annulus 12 surrounding a central cylindrical cavity 13 and is formed with an outside tapering surface 14 decreasing in size toward the entrance end 15 of the socket. The inner end of the socket is provided with an integral peripheral flange 16 to provide a flat base with the inner surface on a plane common with the inner end of the annulus 12. The entrance end of the socket 10 is formed with a restricted opening 17 defined by a bead-like inward projection 18. Specifically, the inward projection has an arcuate convex surface 19 facing inwardly toward the cavity 13 and a diverging conical surface 20 extending to the entrance end 15 of the socket. As noted, the conical surface 20 joins the convex surface 19 at a definite angular juncture as indicated by the line 21.

The stud element 11 consists of a base flange 25, a solid shank or neck 26 and a bulbous head 27. The largest diameter of the bulbous head is defined by a relatively narrow flat surface 28 which is in the order of about .017" greater than the restricted opening 17 of the socket element 10. The larger diameter surface 28 joins the neck 26 by a beveled surface 29 angled about 40° to the axis of the stud, and the outer leading end of the stud head is also defined by a beveled surface angled about 30° to the axis of the stud. In order to render the head of the stud resilient and pliant, a recess 31 extends axially into the head thereof and opening through its outer end. This recess 31 preferably has slightly tapered sidewalls 32 and its inner base end 33 is positioned beyond the zone of the larger diameter surface 28 of the stud head 27 for reasons as will appear later.

In fastening the stud element 11 to a support piece 34, the base flange 25 is positioned against the surface thereof, and by applying heat and pressure to the flange 25, the adjacent surface of the flange will be fused to the support piece as indicated at 35. If desired, the die may be formed to provide a series of radial recesses 36 in the upper or exposed surface of the flange 25 for creating a decorative effect. Also, by producing the series of radial recesses during the fusing operation, as shown in FIG. 4, a series of radial spokes 37 are provided having the same thickness as the original flange and thereby affording additional strength to that portion of the flange.

In the operation of snapping together the stud and socket elements after they are attached to their respective supports, it is customary to align the stud with the socket and to force the stud head 27 into the socket cavity 13. During this operation, the forcing of the larger size head 27 through the restricted opening 17 will cause a contraction of the stud head 27 (which is permitted by reason of the stud head recess 31) and a slight extension of the socket opening 17.

In removing any stud from a socket, the action is by a hinging or biasing of one member relative to the other. In this case, the under beveled surface 29 of the stud head will be caught under the convex surface 19 of the socket opening 17 and the opposite side of the stud head—that is, the side to which the pull is exerted—will arc by the socket restricted opening 17 and cause the stud head to collapse in the manner as shown in FIG. 3. Therefore, the annulus 12 of the socket will not be required to stretch to the extent that it would with a stud head of solid cross-section.

What I claim is:

1. In a snap fastener in which the socket and stud elements each consist of a single piece of pliable plastic material, wherein said stud element comprises
   (a) a substantially flat base by which the element may be attached to supporting material;
   (b) a neck of solid cross-section projecting centrally from said base and terminating in
   (c) a head of larger outside diameter than the neck, said head joining said neck by a beveled surface and having an axially extending recess through the major portion of the head and opening through the end of the stud, said recess being of such size that a portion of the stud head wall surrounding said recess may collapse inwardly to permit easy action when the stud head is being engaged or disengaged from the socket, the inner surfaces of the sidewalls of said recess tapering inwardly from the end of the stud to the bottom of said recess.

2. The combination defined in claim 1 wherein the axial extent of said recess is beyond the zone of the larger outside diameter of the head.

References Cited in the file of this patent

UNITED STATES PATENTS

| | | |
|---|---|---|
| 1,915,249 | Jorgensen | June 20, 1933 |
| 2,806,314 | Moran | Sept. 17, 1957 |
| 2,851,078 | Mellon et al. | Sept. 9, 1958 |
| 2,895,199 | Jones | July 21, 1959 |
| 2,961,725 | McGee | Nov. 29, 1960 |

FOREIGN PATENTS

| | | |
|---|---|---|
| 856,181 | France | Mar. 11, 1940 |